United States Patent
Kwon et al.

(10) Patent No.: US 8,594,493 B2
(45) Date of Patent: Nov. 26, 2013

(54) IMAGE PHOTOGRAPHING DEVICE HAVING FUNCTION FOR COMPENSATING FOR HAND VIBRATION

(75) Inventors: Oh Byoung Kwon, Suwon-si (KR); Sung Hoon Kim, Hwaseong-si (KR); Sang Hwan Oh, Anyang-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 177 days.

(21) Appl. No.: 12/929,946

(22) Filed: Feb. 25, 2011

(65) Prior Publication Data
US 2012/0082442 A1    Apr. 5, 2012

(30) Foreign Application Priority Data
Oct. 4, 2010 (KR) .................. 10-2010-0096373

(51) Int. Cl.
*G03B 17/00* (2006.01)
(52) U.S. Cl.
USPC .................................................. 396/55
(58) Field of Classification Search
USPC ........... 396/52, 55; 348/208.2, 208.99, 208.4, 348/208.5, 208.7
See application file for complete search history.

(56) References Cited

U.S. PATENT DOCUMENTS

| | | | |
|---|---|---|---|
| 6,982,746 B1 * | 1/2006 | Kawahara | 348/208.99 |
| 2006/0018644 A1 * | 1/2006 | Stavely | 396/55 |
| 2008/0309773 A1 * | 12/2008 | Sekino et al. | 348/208.7 |
| 2010/0080545 A1 * | 4/2010 | Fan et al. | 396/55 |
| 2011/0096178 A1 * | 4/2011 | Ryu et al. | 348/208.2 |
| 2011/0122267 A1 * | 5/2011 | Ahn et al. | 348/208.7 |
| 2011/0211821 A1 * | 9/2011 | Park et al. | 396/55 |
| 2012/0154614 A1 * | 6/2012 | Moriya et al. | 348/208.5 |

FOREIGN PATENT DOCUMENTS

| | | |
|---|---|---|
| JP | 2009-229789 | 10/2009 |
| KR | 10-2009-0092665 | 9/2009 |
| KR | 10-2009-0127628 | 12/2009 |
| KR | 10-2010-0041011 | 4/2010 |
| KR | 10-2006-0066678 | 6/2010 |

OTHER PUBLICATIONS

Korean Office Action dated Oct. 31, 2011 issued in corresponding Korean Patent Application No. 10-2010-0096373.

* cited by examiner

*Primary Examiner* — Clayton E LaBalle
*Assistant Examiner* — Warren K Fenwick

(57) ABSTRACT

An image photographing device having a function for compensating hand vibration to simultaneously perform auto focusing and hand vibration compensation. The image photographing has a function for compensating hand vibration and includes a bobbin having a lens unit mounted therein, a driving coil in a Z axis direction wound on an outer peripheral surface thereof, and a driving coil in an X axis direction and a driving coil in a Y axis direction mounted outside the driving coil in a Z direction, a plurality of magnets mounted outside the driving coil in an X axis direction and the driving coil in a Y axis direction, an elastic member elastically combined with an upper portion and a lower portion of the bobbin, a housing into which the bobbin combined with the magnet and the elastic member is inserted, and a shield case combined with an upper portion of the housing.

12 Claims, 4 Drawing Sheets

IMAGE PHOTOGRAPHING DEVICE HAVING FUNCTION FOR COMPENSATING FOR HAND VIBRATION

CROSS REFERENCES TO RELATED APPLICATION

This application claims the benefit under 35 U.S.C. Section 119 of Korean Patent Application Serial No. 10-2010-0096373, entitled "Image Photographing Device Having Function for Compensating for Hand Vibration", filed on Oct. 4, 2010, which is hereby incorporated by reference in its entirety into this application.

BACKGROUND OF THE INVENTION

1. Technical Field

The present invention relates to an image photographing device having a function for compensating for hand vibration, and more particularly, to an image photographing device having a function for compensating for hand vibration in which coils and magnets are additionally disposed outside a bobbin having a lens unit mounted therein to simultaneously perform auto focusing and hand vibration compensation.

2. Description of the Related Art

Recently, the use of a subminiature camera has gradually increased in a mobile device such as a cellular phone, a notebook, a tablet PC, or the like. The demand of customers for subminiature camera used in the mobile device and having a high pixel of five million pixels or more and a multi-function such as a zoom function, an auto focus (AF) function, and the like has been increased.

Generally, a camera module used in the mobile device may be configured to include an optical system having a lens, a lens driver moving the optical system in an optical axis direction to adjust a focus, and an image sensor photographing light input through the optical system to convert the photographed light into an image signal.

As the number of pixels of the camera module is increased and the function thereof is diversified, the size of the pixel becomes small and the number of components through which the light passes is increased. Accordingly, the receiving sensitivity of the light photographed by the image sensor becomes sensitive, and the image photographed by the image sensor becomes out of focus even with small hand vibration when operating a shutter of the camera or the mobile device, such that image quality is deteriorated. Therefore, it is impossible to obtain a sharp photograph.

The light passing through the lens of the optical system becomes out of the optical axis of the lens due to the hand vibration. Therefore, in order to prevent the deterioration of the image quality due to the hand vibration, the lens is moved in a direction perpendicular to the optical axis to coincide the optical axis of the lens with an incident path of the light or the image sensor is moved in a direction perpendicular to the optical axis to align the optical axis with an incident path of the light received in the image sensor, thereby compensating for the hand vibration.

That is, the lens or the image sensor is relatively displaced in the direction perpendicular to the optical axis, respectively, thereby making it possible to compensate for the hand vibration.

In a scheme that relatively displaces the lens or the image sensor to compensate for the hand vibration, generally, a two-axis guide supporting the lens in a T shape or an L shape is mounted, such that the lens is moved in the relative direction of the driving displacement generated due to the hand vibration, while being moved in the direction perpendicular to the optical axis along the two-axis guide, thereby compensating for the hand vibration.

When the lens is moved along the two-axis guide, a compensation performance may be deteriorated due to the friction between the two-axis guide and the lens. Also, when driving the two-axis guide and the lens or the two-axis guide, noise or foreign material may occur due to the friction with other components.

In addition, since the two-axis guide supports the periphery of the lens, the size of the camera module cannot but be enlarged by a space in which the two-axis guide is mounted.

SUMMARY OF THE INVENTION

An object of the present invention is to provide an image photographing device having a function for compensating for hand vibration in which a driving coil in an X axis direction and a driving coil in a Y axis direction are additionally disposed outside a bobbin having a lens unit mounted therein to simultaneously move, in X and Y axis directions, the bobbin vertically moved through a driving coil in a Z axis direction, thereby simultaneously performing auto focusing and hand vibration compensation.

According to an exemplary embodiment of the present invention, there is provided an image photographing device having a function for compensating for hand vibration, including: a bobbin having a lens unit mounted therein, a driving coil in a Z axis direction wound on an outer peripheral surface thereof, and driving coils in an X axis direction and a Y axis direction mounted outside the driving coil in a Z direction; a plurality of magnets mounted outside the driving coils in an X axis direction and a Y axis direction; an elastic member elastically combined with an upper portion and a lower portion of the bobbin; a housing into which the bobbin combined with the magnet and the elastic member is inserted; and a shield case combined with an upper portion of the housing.

The lens unit mounted in the bobbin may have at least one lens stacked inside a cylindrical lens barrel, and be integrally formed with the bobbin to have at least one lens mounted therein.

A low portion of the housing may be mounted with a substrate of which a center is mounted with an image sensor, and light input through the lens combined with the lens unit may be received in the image sensor.

The driving coil in a Z axis direction may be wound over the whole peripheral surface of the bobbin in a counterclockwise direction, such that the bobbin may be moved up and down in an optical axis according to whether or not there is a magnetic field generated between the driving coil in a Z axis direction and the magnet disposed outside the driving coil in a Z axis direction.

The bobbin may be formed in a polygonal shape, and each of the driving coil in an X axis direction and the driving coil in a Y axis direction may be mounted outside the driving coil in a Z axis direction on each side of the bobbin. At this time, the driving coils in an X axis direction may be disposed on one opposite side of the bobbin and the driving coils in a Y axis direction may be disposed on another opposite side thereof, and the bobbin may be horizontally moved in an X axis direction or in a Y axis direction by the magnetic field generated between the driving coil in an X axis direction and the driving coil in a Y axis direction and the magnet mounted outside the driving coil in an X axis direction and the driving coil in a Y axis direction.

The movement direction of the bobbin may be determined by Fleming's left hand rule according to winding directions of the driving coil in a Z axis direction, and the driving coils in an X axis direction on one opposite side may be wound in opposite directions and the driving coils in a Y axis direction disposed on another opposite side may be wound in opposite directions, such that the movement direction of the bobbin may satisfy Fleming's left hand rule.

A pair of driving coils in an X axis direction may be disposed on one opposite side of the bobbin in parallel at predetermined intervals and a pair of driving coils in a Y axis direction may be disposed on another opposite side thereof in parallel at predetermined intervals, and each of the driving coils disposed in parallel may be wound in opposite directions to each other.

The plurality of magnets each may be disposed on four sides of the outside of the bobbin on which the driving coil in an X axis direction and the driving coil in a Y axis direction are wound, such that an electromagnetic force may be generated by the current applied to the driving coil in a Z axis direction, and the driving coil in an X axis direction and the driving coil in a Y axis direction.

The magnets may be mounted at positions corresponding to the driving coil in an X axis direction and the driving coil in a Y axis direction, and may be formed at a width exceeding each inner winding portion of the pair of driving coils in an X axis direction and a pair of driving coils in a Y axis direction so that the electromagnetic force is generated according to winding directions of the inner winding portion of each of the driving coil in an X axis direction and the driving coil in a Y axis direction. In addition, the magnets may be formed at a width not exceeding each outer winding portion of the pair of driving coils in an X axis direction and the pair of driving coils in a Y axis direction.

The elastic members may be each combined with the upper portion and the lower portion of the bobbin and have power connectors extendedly formed on one side thereof to be electrically connected to the substrate mounted on a lower portion of the housing. The elastic members apply current to each of the driving coils wound on the bobbin through springs formed on all sides thereof.

DESCRIPTION OF THE PREFERRED EMBODIMENTS

The acting effects and technical configuration with respect to the objects of an image photographing device having a function for compensating for hand vibration according to an exemplary embodiment of the present invention will be clearly understood by the following description in which exemplary embodiments of the present invention are described with reference to the accompanying drawings.

Figure 1:
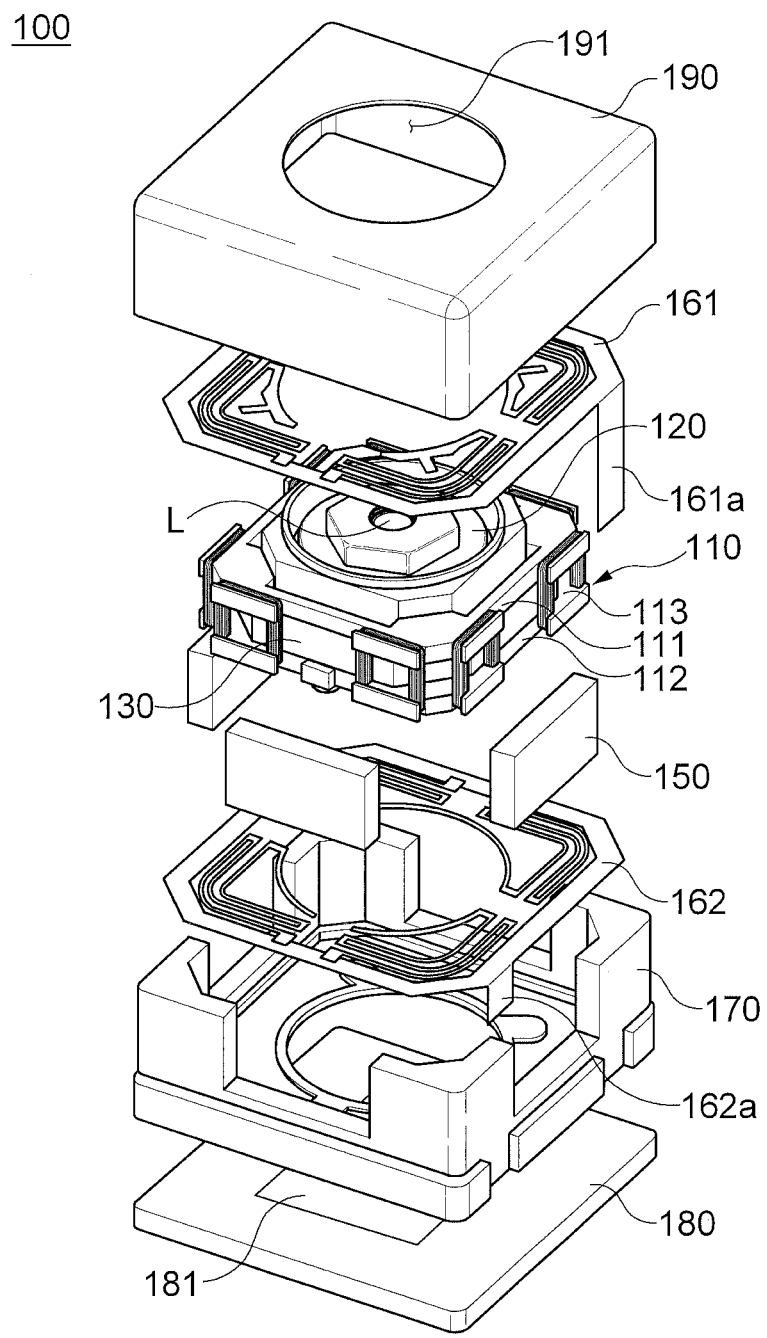
FIG. 1 is an exploded perspective view of an image photographing device according to an exemplary embodiment of the present invention.
Figure 2:
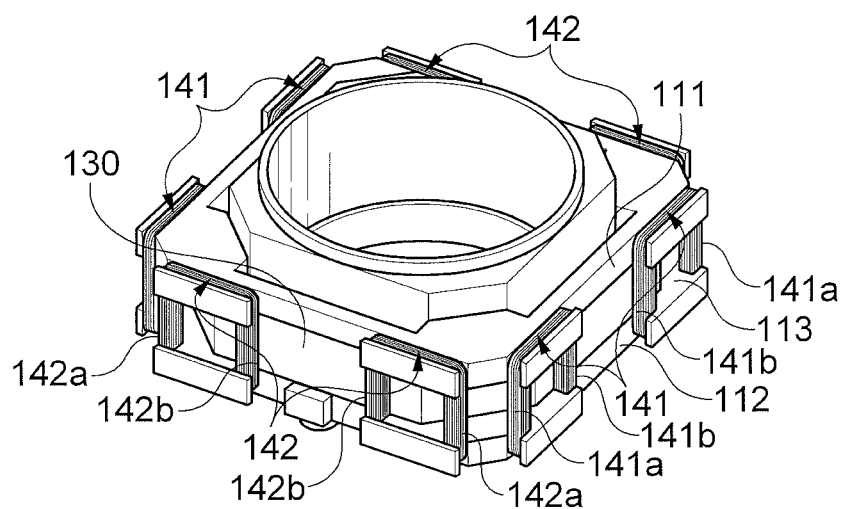
FIG. 2 is a perspective view of a bobbin used in the image photographing device according to the exemplary embodiment of the present invention.
Figure 3:
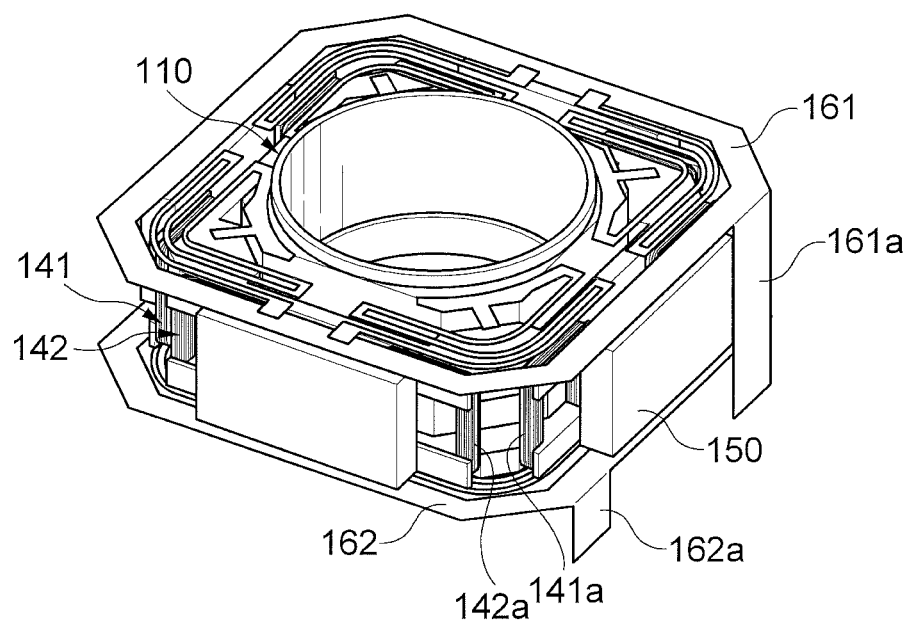
FIG. 3 is a perspective view of a state in which elastic members and magnets are mounted on the bobbin used in the image photographing device according to the exemplary embodiment of the present invention.

FIG. 1 is an exploded perspective view of an image photographing device according to an exemplary embodiment of the present invention, FIG. 2 is a perspective view of a bobbin used in the image photographing device according to the exemplary embodiment of the present invention, and FIG. 3 is a perspective view of a state in which elastic members and magnets are mounted on the bobbin used in the image photographing device according to the exemplary embodiment of the present invention.

As shown in FIGS. 1 to 3, an image photographing device 100 having a function for compensating for hand vibration according to an exemplary embodiment of the present invention may include a bobbin 10 having a lens unit 120 mounted therein, a magnet 150 mounted outside the bobbin 110, elastic members 161 and 162 combined with an upper portion and a lower portion of the bobbin 110, and a housing 170 into which the bobbin 110 having the elastic members 161 and 162 combined therewith is inserted.

A low portion of the housing 170 may be mounted with a substrate 180 having an image sensor 181 mounted on a center thereof, and an upper portion of the housing 170 may be mounted with a shield case 190 formed with an opening 191 to expose an upper portion of the lens unit 120 mounted in the bobbin 110.

The center of the bobbin 110 is mounted with the lens unit 120. Therefore, the lens unit 120 has at least one lens (L) stacked inside a cylindrical lens barrel, such that light reflected from an external object is input through the lens (L) mounted in the lens unit 120 to be photographed by the image sensor 181 mounted on the lower portion of the housing 170.

The bobbin 110 may be mounted in the housing 170, while the upper portion and the lower portion thereof being each combined with the elastic members 161 and 162, as shown in FIG. 3. The bobbin 110 may be divided into an upper plate 111 and a lower plate 112, and have a driving coil 130 in a Z axis direction wound on an outer peripheral surface thereof between the upper plate 111 and the lower plate 112.

In addition, the bobbin 110 may have a plurality of driving coils 141 in an X axis direction and a plurality of driving coils 142 in a Y axis direction wound outside the driving coil 130 in a Z axis direction. The driving coils 141 in an X axis direction may be wound on one opposite side of the bobbin 110 formed in a polygonal shape and the driving coils 142 in a Y axis direction may be wound on another opposite side thereof. In addition, the driving coil 141 in an X axis direction and the driving coil 142 in a Y axis direction may be wound on winders 113 each extended from the upper plate 111 and the lower plate 112 to the outside, in each different direction.

At this time, the driving coil 141 in an X axis direction and the driving coil 142 in a Y axis direction mounted on each side of the bobbin 110 may be wound on the winder 143 at a predetermined width, as described above. Alternately, driving coils wound at a predetermined width may also be attached to sides of the bobbin 100, without forming the winder 113 on the bobbin 110.

The pair of the driving coils 141 in an X axis direction and the pair of the driving coils 142 in a Y axis direction may be disposed on each side of the bobbin 110 in parallel at predetermined intervals. As a result, a total of eight driving coils may be mounted along the circumference of the bobbin 110. In addition, the driving coil 141 in an X axis direction may be formed through four driving coils mounted on one opposite side of the bobbin 110 and the driving coil 142 in a Y axis direction may be formed through four driving coils mounted on another opposite side thereof. The driving coils may be divided into the driving coil 141 in an X axis direction and the driving coil 142 in a Y axis direction according to a winding direction of each driving coil. Hereinafter, principles of forming electromagnetic forces according to the winding direction of the driving coil 141 in an X axis direction and the driving coil 142 in a Y axis direction and determining a moving direction of the bobbin 110 by the electromagnetic forces generated in the driving coils will be described in detail.

The bobbin 110 is inserted into the housing 170 in the state in which the driving coil 130 in a Z axis direction, and the driving coil 141 in an X axis direction and the driving coil 142 in a Y axis direction are mounted on a polygonal outer peripheral surface of the bobbin 110, respectively. When the bobbin 110 is inserted into the housing 170, the elastic members 161 and 162 each made of a plate spring in the same shape may be combined with the upper portion and the lower portion of the bobbin 110.

Power connectors 161a and 162a are extendedly formed on one side of the elastic members 161 and 162, such that the extended ends of the power connectors 161a and 162a are connected to the substrate 180 mounted on the lower portion of the housing 170. Therefore, each of the elastic members 161 and 162 may be electrically connected to the substrate 180. In addition, the elastic members 161 and 162 are electrically connected to the driving coil 130 in a Z axis direction, and the driving coil 141 in an X axis direction and the driving coil 142 in a Y axis direction, wound on the outer peripheral surface of the bobbin 110, thereby making it possible to independently apply a predetermined current to each of the driving coils 130, 141 and 142.

Meanwhile, a plurality of magnets 150 may be disposed at positions corresponding to the driving coil 141 in an X axis direction and the driving coil 142 in a Y axis direction outside each side of the bobbin 110, respectively. The magnet 150 is preferably formed to have a width not exceeding outer winding portions 141a and 142a of a pair of driving coils mounted on the side of the bobbin 110.

At this time, the reason why the magnet 150 is formed at the width not exceeding the outer winding portions 141a and 142a of the pair of driving coils is to generate the electromagnetic forces according to the winding directions of inner winding portions 141b and 142b of the pair of driving coils generating the electromagnetic forces, together with the magnet 150. When the magnet 120 is formed at a width exceeding the outer winding portion 141a and 142a of the pair of driving coils, the winding direction of the outer winding portions 141a and 142a of the driving coils is opposite to that of the inner winding portions 141b and 142b thereof, such that the electromagnetic forces in the opposite directions to each other occur between the magnet 150 and the driving coil 141 in an X axis direction and the driving coil 142 in a Y axis direction. Therefore, the bobbin 110 is not moved.

Meanwhile, since the bobbin 110 is inserted into the housing 170 in the state in which the magnet 150 is mounted between the elastic members 161 and 162 combined with the upper portion and the lower portion thereof, it may be maintained in a floated state within the housing 170 due to the electromagnetic forces formed between each of the driving coils 130, 141 and 142 and the magnet 150 by the current applied to each of the driving coils 130, 141 and 142 through the elastic members 161 and 162.

When the light is out of an optical axis of the lens unit 120 due to the hand vibration, and the like, within the housing 170, the bobbin 110 changes the amount of the current applied to the driving coil 141 in an X axis direction and the driving coil 142 in a Y axis direction wound thereon to be moved in X axis and Y axis directions in the floated state within the housing 170, thereby aligning the optical axis of the lens (L) stacked in the lens unit 120 with an incident path of the light. Therefore, it is possible to compensate for the hand vibration.

After the bobbin 110 is inserted into the housing 170, the shield case 190 in which the opening 191 exposing the upper portion of the lens unit 120 mounted in the bobbin 110 is formed covers the upper portion of the housing 170, such that assembly of the image photographing device may be completed.

A layout of the magnet and each of the driving coils wound on the bobbin of the image photographing device having a function for compensating for hand vibration according to the exemplary embodiment of the present invention and a driving principle of the bobbin for auto focusing and hand vibration compensation will be described in detail with reference to FIGS. 4 to 7.

Figure 4:
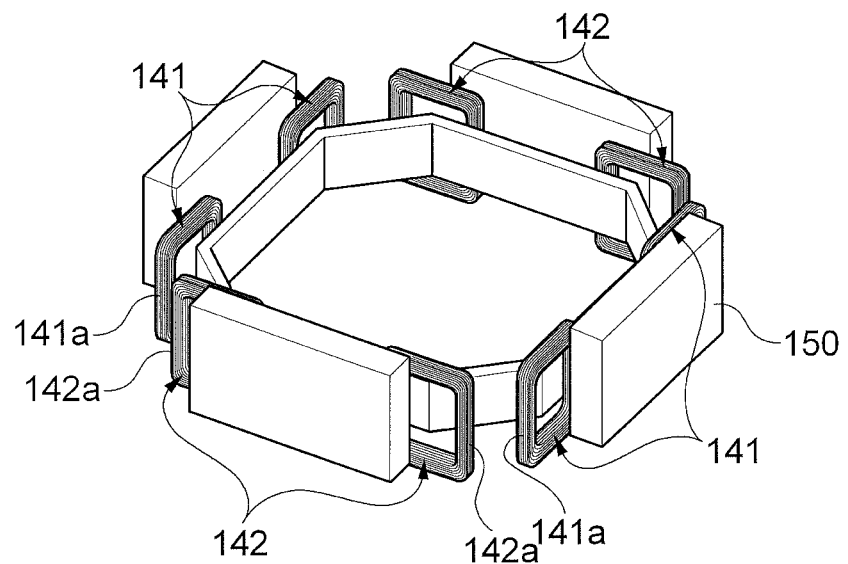
FIG. 4 is a layout of driving coils and the magnets mounted on the bobbin used in the image photographing device according to the exemplary embodiment of the present invention.
Figure 5:
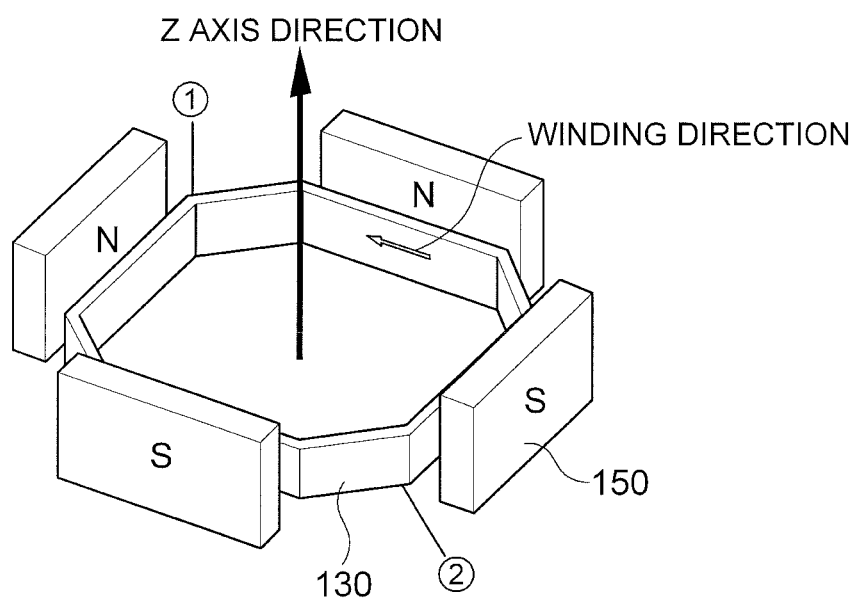
FIG. 5 is a layout of a driving coil in a Z-axis direction mounted on the bobbin of the image photographing device according to the exemplary embodiment of the present invention.
Figure 6:
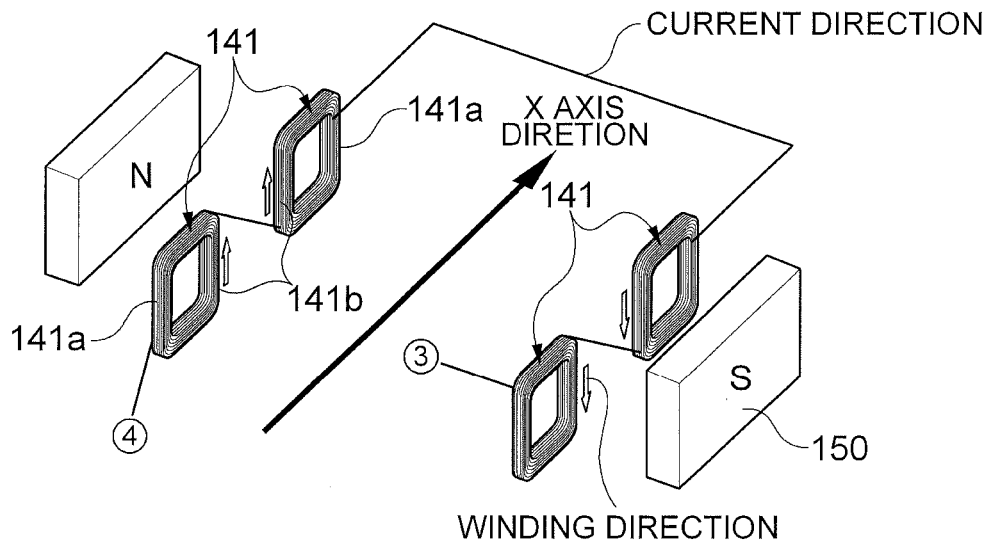
FIG. 6 is a layout of a driving coil in an X-axis direction mounted on the bobbin of the image photographing device according to the exemplary embodiment of the present invention.
Figure 7:
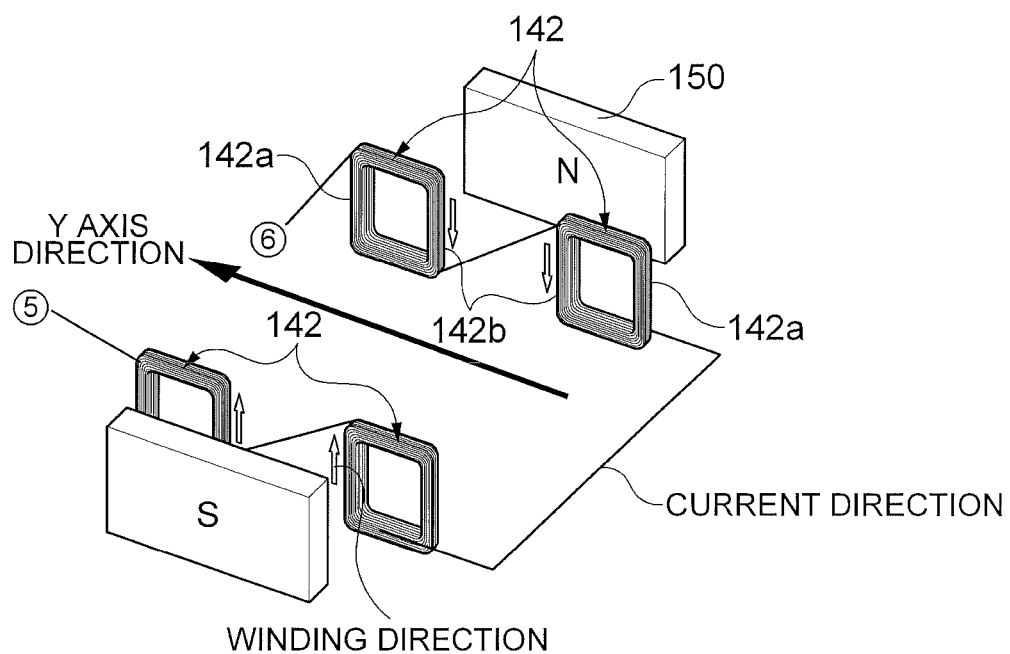
FIG. 7 is a layout of a driving coil in a Y-axis direction mounted on the bobbin of the image photographing device according to the exemplary embodiment of the present invention.

FIG. 4 is a layout of driving coils and the magnets mounted on the bobbin used in the image photographing device according to the exemplary embodiment of the present invention, FIG. 5 is a layout of a driving coil in a Z-axis direction mounted on the bobbin of the image photographing device according to the exemplary embodiment of the present invention, FIG. 6 is a layout of a driving coil in an X-axis direction mounted on the bobbin of the image photographing device according to the exemplary embodiment of the present invention, and FIG. 7 is a layout of a driving coil in a Y-axis direction mounted on the bobbin of the image photographing device according to the exemplary embodiment of the present invention.

As shown in FIG. 4, the driving coil 130 in a Z axis direction, the driving coil 141 in an X axis direction and the driving coil 142 in a Y axis direction, and the magnets 150 may be sequentially mounted outside the bobbin 110 (not shown). The bobbin 110 may be moved in each of the X, Y, and Z axis directions by the electromagnetic force formed by a magnetic field generated between the driving coil 130 in a Z axis direction, the driving coil 141 in an X axis direction and the driving coil 142 in a Y axis direction to which a predetermined current is applied, where the magnets 150 are disposed on four sides of the bobbin 110.

At this time, the electromagnetic forces generated through the driving coil 130 in a Z axis direction, the driving coil 141 in an X axis direction and the driving coil 142 in a Y axis direction, and the magnets 150 may be in accordance with Fleming's left hand rule. The electromagnetic forces in different directions are generated between the magnet 150 and the each of the driving coils 130, 141 and 142 according to the winding direction of each of the driving coils 130, 141 and 142, thereby making it possible to move the bobbin 110 in X, Y and Z axis directions. A moving principle of the bobbin in each direction will be described below with reference to FIGS. 5 to 7.

FIG. 5 is a layout of the driving coil in a Z-axis direction mounted on the bobbin. As shown in FIG. 5, the driving coil 130 in a Z axis direction may be wound in one direction, that is, in a counterclockwise direction, outside the bobbin 110 (not shown), and the plurality of magnets 150 may be disposed on each side of the bobbin. At this time, each of the magnets 150 may be disposed on the side of the driving coil 130 in a Z axis direction so that N poles thereof face to the driving coil 130 in a Z axis direction. When the current is applied to the driving coil 130 in a Z axis direction, the electromagnetic force occurs in a vertical direction, which is the direction of the optical axis based on Fleming's left hand rule, thereby making it possible to move, in the optical axis direction, the bobbin 110 on which the driving coil 130 in a Z axis direction is wound.

The bobbin 110 moved by electromagnetic force formed by the driving coil 130 in a Z axis direction and the magnets 150 has the lens unit 120 combined therein, thereby making it possible to perform auto focusing by adjusting an interval between the image sensor 181 and the lens unit 120 while being vertically moved in the optical axis direction. At this time, the adjustment of the interval between the image sensor 181 and the lens unit 120 according to the moving distance of the bobbin 110 may be performed in accordance with the amount of current applied to the driving coil 130 in a Z axis direction.

In addition, as described above, current may be applied to the driving coil 130 in a Z axis direction through the elastic members 161 and 162 mounted on the upper portion and the lower portion of the bobbin 110. Point $\hat{1}$ and point $\hat{2}$ of the driving coil 130 in a Z axis direction are connected to the elastic members 161 and 162, respectively, such that the applied current may flow in a direction in which the driving coil in a Z axis direction is wound.

Meanwhile, the hand vibration compensation through a horizontal movement in X axis direction and Y axis direction of the bobbin 110 may be performed by the electromagnetic force generated between the driving coil 141 in an X axis direction and the driving coil 142 in a Y axis direction and the magnets 150, as shown in FIGS. 6 and 7. The bobbin may be moved in the X axis direction by the electromagnetic force generated between a pair of driving coils 141 in an X axis direction each disposed on one opposite side of sides of the bobbin 110 (not shown in FIG. 6) and the magnets 150 disposed at the positions corresponding to those of the pair of driving coils 141 in an X axis direction, as shown in FIG. 6.

The driving coil 141 in an X axis direction may be configured of four driving coils formed in pair, which are disposed on one opposite side of the bobbin 110 to be in parallel with each other. The pair of driving coils 141 in an X axis direction disposed in parallel on one side is wound in opposite directions to each other, such that the winding directions of the inner winding portions 141b may be the same. At this time, the winding directions of the inner winding portions 141b of a pair of driving coils 141 in an X axis direction disposed in parallel on the other side and the pair of driving coils 141 in an X axis direction disposed on one side may be opposite to each other. That is, the driving coils formed at opposite positions in a diagonal direction of the four driving coils disposed on one opposite side of the bobbin 110 may be wound in the same direction.

The reason why the inner winding portions of the driving coils 141 in an X axis direction each disposed on one opposite side of the bobbin 110 are in different directions is to generate the electromagnetic force in the same X axis direction, wherein the electromagnetic force is generated between the driving coils 141 in an X axis direction and the magnets 140 on both sides according to the Fleming's left hand rule.

In addition, the bobbin may be moved in the Y axis direction by the electromagnetic force generated between a pair of driving coils 142 in a Y axis direction disposed on another opposite side of the sides of the bobbin 110 (not shown in FIG. 7) and the magnets 150 disposed at the positions corresponding to those of the pair of driving coils 141 in a Y axis direction, as shown in FIG. 7.

Similar to the driving coil 141 in an X axis direction, the driving coil 142 in a Y axis direction may be configured of four driving coils formed in pair, which is disposed on another opposite side of the bobbin 110 to be in parallel with each other. The pair of driving coils 142 in a Y axis direction disposed in parallel on one side is wound in opposite directions to each other, such that the winding directions of the inner winding portions 142b may be the same. The winding directions of the inner winding portions 142b of the pair of driving coils 142 in a Y axis direction disposed in parallel on the other side and the pair of driving coils 142 in a Y axis direction disposed on one side may be opposite to each other.

Accordingly, similar to the driving coils 141 in an X axis direction, the Fleming's left hand rule is also applied to the driving coils 142 in a Y axis direction when the current is applied thereto, such that the electromagnetic force in the Y axis direction is generated between each of the driving coils and the magnets 150, thereby making it possible to move the bobbin 110 in the Y axis direction.

At this time, application of the current to each of the driving coil 141 in an X axis direction and the driving coil 142 in a Y axis direction starts at point $\hat{3}$ and point $\hat{5}$, and ends at point $\hat{4}$ and point $\hat{6}$. The coil terminals of $\hat{1}$ to $\hat{6}$ of the driving coil 130 in a Z axis direction, the driving coil 141 in an X axis direction and the driving coil 142 in a Y axis may be electrically connected through the elastic members 161 and 162 mounted on the upper portion and the lower portion of the bobbin 110.

As described above, the image photographing device having a function for compensating for hand vibration moves the bobbin having the lens unit mounted therein, in all directions, through a structure in which the magnet is disposed outside the driving coil in a Z axis direction, and the driving coil in an X axis direction and the driving coil in a Y axis direction wound on the bobbin, thereby making it possible to perform auto focusing and hand vibration compensation. Therefore, a structure of the image photographing device having a function for compensating for hand vibration may be simplified, thereby making it possible to simplify a manufacturing process of the image photographing device and reduce a manufacturing cost thereof.

In addition, according to the image photographing device having a function for compensating for hand vibration of the exemplary embodiments of the present invention, when configuring the lens unit and the bobbin with which the lens is combined, a separate suspension wire for supporting the lens unit or the bobbin is not required, and the auto focusing and the hand vibration compensation may be simultaneously performed only by the electromagnetic force generated through the driving coils in each direction and the magnet within the housing, thereby making it possible to reduce the size and the height of the image photographing device.

The present invention has been described in connection with what is presently considered to be practical exemplary embodiments. Although the exemplary embodiments of the present invention have been described, the present invention may be also used in various other combinations, modifications and environments. In other words, the present invention may be changed or modified within the range of concept of the invention disclosed in the specification, the range equivalent to the disclosure and/or the range of the technology or knowledge in the field to which the present invention pertains. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. An image photographing device having a function for compensating for hand vibration, comprising:
 a bobbin having a lens unit mounted therein, a driving coil in a Z axis direction wound on an outer peripheral surface thereof, and driving coils in an X axis direction and a Y axis direction mounted outside the driving coil in a Z direction, wherein the driving coil in the Z axis direction is wound over the whole peripheral surface between an upper plate and a lower plate of the bobbin;
 a plurality of magnets mounted outside the driving coils in an X axis direction and a Y axis direction;
 an elastic member elastically combined with an upper portion and a lower portion of the bobbin;
 a housing into which the bobbin combined with the magnet and the elastic member is inserted; and
 a shield case combined with an upper portion of the housing.

2. The image photographing device having a function for compensating for hand vibration according to claim 1, wherein the lens unit has at least one lens stacked inside a cylindrical lens barrel.

3. The image photographing device having a function for compensating for hand vibration according to claim 1, wherein a lower portion of the housing is mounted with a substrate of which a center is mounted with an image sensor.

4. The image photographing device having a function for compensating for hand vibration according to claim 1, wherein the bobbin is formed in a polygonal shape, and the driving coils in an X axis direction are disposed on one opposite side of the bobbin and the driving coils in a Y axis direction are disposed on another opposite side thereof.

5. The image photographing device having a function for compensating for hand vibration according to claim 4, wherein a pair of driving coils in an X axis direction and a pair of driving coils in a Y axis direction are disposed in parallel at predetermined intervals on each side of the bobbin .

6. The image photographing device having a function for compensating for hand vibration according to claim 5, wherein the pair of driving coils in an X axis direction and the pair of driving coils in a Y axis direction disposed in parallel on one side of the bobbin are wound in opposite direction to each other.

7. The image photographing device having a function for compensating for hand vibration according to claim 6, wherein the driving coil in an X axis direction and the driving coil in a Y axis direction formed at opposite positions in a diagonal direction of the four driving coils disposed on the opposite sides of the bobbin are wound in the same direction.

8. The image photographing device having a function for compensating for hand vibration according to claim 1, wherein Fleming's left hand rule is applied to the driving coil in a Z axis direction and the driving coil in an X axis direction and the driving coil in a Y axis direction through the magnet disposed on four sides of the bobbin when current is applied to the coils to generate an electromagnetic force in an X axis direction and a Y axis direction, respectively.

9. The image photographing device having a function for compensating for hand vibration according to claim 8, wherein the magnet is disposed so that N poles thereof face the four sides of the bobbin on which the driving coil in an X axis direction and the driving coil in a Y axis direction are mounted.

10. The image photographing device having a function for compensating for hand vibration according to claim 9, wherein the magnet is formed with a width exceeding inner winding portions of the pair of driving coils in an X axis direction and the pair of driving coils in a Y axis direction but not exceeding outer winding portions of the pair of driving coils in an X axis direction and the pair of driving coils in a Y axis direction.

11. The image photographing device having a function for compensating for hand vibration according to claim 1, wherein the elastic members have power connectors each extendedly formed on one side thereof, to be electrically connected to the substrate mounted on a lower portion of the housing.

12. The image photographing device having a function for compensating for hand vibration according to claim 11, wherein the elastic members apply current to the driving coil in a Z axis direction and the driving coil in an X axis direction and the driving coil in a Y axis direction wound on the bobbin through springs formed on all sides thereof.

* * * * *